Aug. 30, 1949.  P. D. THOMPSON  2,480,390
ANIMATED DECOY AND ACTUATING MECHANISM THEREFOR
Filed July 3, 1947  2 Sheets-Sheet 1

Inventor
Paul D. Thompson
By Randolph & Beavers
Attorneys

Aug. 30, 1949.  P. D. THOMPSON  2,480,390
ANIMATED DECOY AND ACTUATING MECHANISM THEREFOR
Filed July 3, 1947  2 Sheets-Sheet 2

Inventor
Paul D. Thompson
By Randolph & Beavers
Attorneys

Patented Aug. 30, 1949

2,480,390

UNITED STATES PATENT OFFICE 2,480,390

ANIMATED DECOY AND ACTUATING MECHANISM THEREFOR

Paul D. Thompson, Enid, Okla.

Application July 3, 1947, Serial No. 758,885

3 Claims. (Cl. 43—3)

This invention relates to an animated decoy for use especially in hunting and has particular reference to a buoyant decoy for use in the water and provided with actuating means for simulating the normal movement of a bird, represented by the decoy body, and for propelling the decoy to realistically simulate a swimming movement of the bird on the water for more readily attracting wild birds of the type simulated by the decoy to the decoy and to within range of a hunter.

More particularly, it is an object of the present invention to provide a hollow decoy body of substantially rigid waterproof construction, having a head, tail and wing portions movably mounted with respect to the remainder of the body and actuating means for simultaneously moving said parts to very realistically simulate the movement of a bird, such as a duck, while feeding on the surface of a body of water.

Still a further object of the invention is to provide a mechanical actuating means of extremely simple construction having connections therefrom to the head, tail and wings of the decoy body for simultaneously actuating said parts to realistically simulate the normal action of a wild bird, represented by the decoy.

Still a further object of the invention is to provide an animated decoy, especially adapted for use as a duck decoy and in connection with the hunting of wild ducks, the body portion of which may be of a shape, size, configuration and coloring to realistically represent any desired species of duck and the animated portion of which and actuating means therefor are capable of being readily assembled to produce an efficient and durable device, and which is capable of being economically manufactured and sold.

Various other objects and advantages of the invention will hereinafter become more fully apparent from the following description of the drawings, illustrating a preferred embodiment thereof, and wherein—

Figure 1:
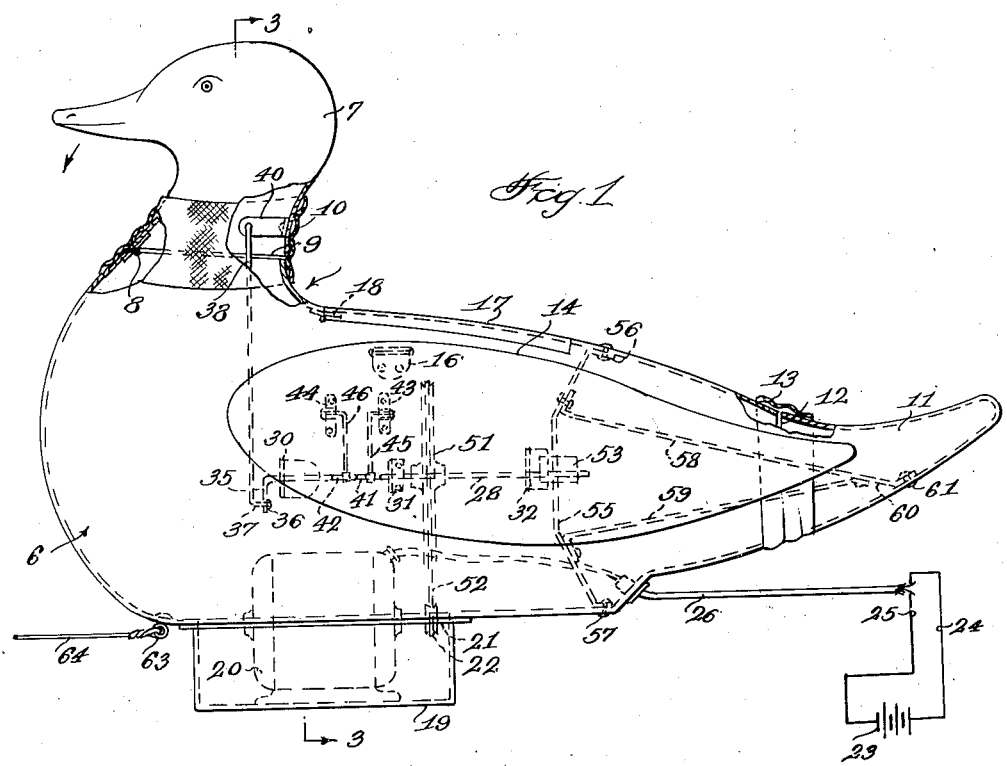
Figure 1 is a side elevational view, partly in vertical section of the decoy.

Referring more particularly to the drawings, the improved animated decoy in its entirety is designated generally 5 and in the embodiment of the invention as illustrated, includes a decoy body, designated generally 6 which is shaped to simulate a wild duck and which is preferably formed from a waterproof, fiberous material, and which forms the hollow body thereof. The decoy body 6 may be externally colored to simulate any desired species of wild duck and it will be readily apparent, as the description proceeds, that the invention is equally well adapted as a decoy for other wild birds and that the body 6 thereof could readily be varied in shape, contour and external coloration for simulating other wild birds.

The decoy body 6 is relatively rigid and includes a head 7 which is mounted for movement relatively to the remainder of the body 6 by being hingedly connected thereto at 8, adjacent the forward or inner side of the neck and which is disengaged from the remainder of the body at a point 9 around the neck and on the plane of the axis of the hinge 8. This separation between the main portion of the body 6 and the head 7 is covered by a relatively wide band 10 of a flexible and waterproofed material, and which is secured at its upper edge to the head 7 and at its lower edge to the body 6, below the severance line and has sufficient slack therebetween to permit a forward and rearward or upward and downward swinging movement of the head 7 on the pivot 8, as will hereinafter be described.

The body 6 is also provided with a tail 11 which is separated from the remainder of said body along a line 12 and which severance is likewise disposed in a wide band or strip of waterproofed, flexible material 13, which is secured at its side edges forwardly and rearwardly of the severance 12 and which has sufficient slack to permit the tail 11 to swing laterally relatively to the remainder of the body 6.

Figure 2:
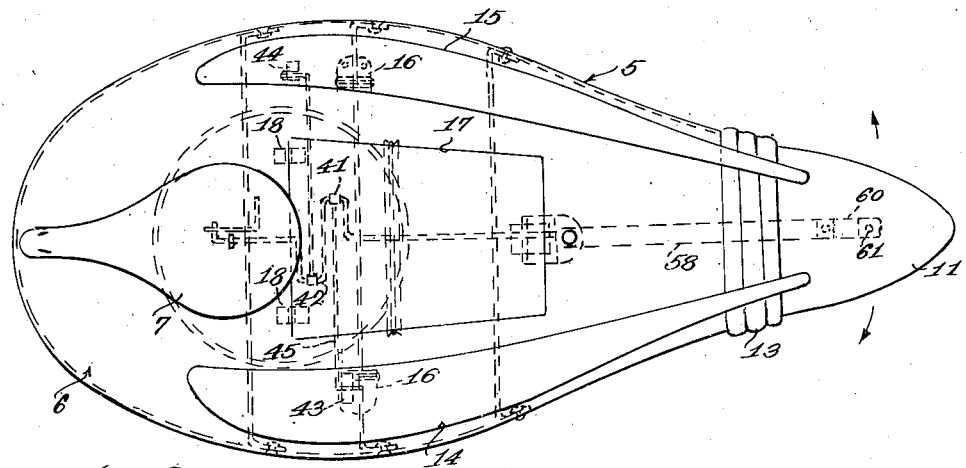
Figure 2 is a top plan view thereof.
Figure 3:
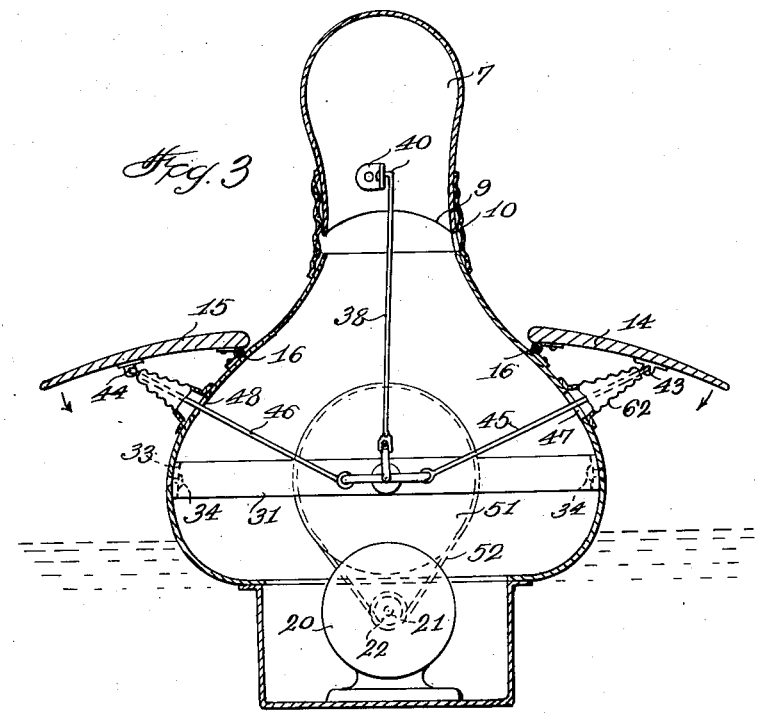
Figure 3 is a cross sectional view taken substantially along a plane as indicated by the line 3—3 of Figure 1.

Portions of the side of the body 6 are normally covered by flaps 14 and 15 which are shaped to simulate wings and which are hingedly connected adjacent their upper, longitudinal edges by hinges 16, to the body 6 and externally thereof, so that the wings 14 and 15 may swing outwardly and upwardly with respect to the body 6 from their folded positions of Figures 1 and 2, to their raised or extended positions, as seen in Figure 3.

The body 6 is preferably also provided with a trap door 17 in the top thereof and which is hingedly connected to the body, adjacent its forward edge, by the internally disposed hinges 18, and which is provided to afford access to the hollow interior of said body 6.

The bottom of the body 6 is provided with a depending portion 19 which is preferably formed integral therewith and which forms a motor compartment. The motor compartment 19 opens at its top upwardly into the body 6 and is adapted to contain any suitable motor means or prime mover, as for example, a small variable speed electric motor 20, which is provided with a rearwardly extending driven shaft 21, having a pulley 22 keyed thereto. The electric motor 20 may be connected to any suitable source of electric current, such as a battery contained within the hollow body 6 or may be connected to an externally disposed source of electric current 23, as illustrated, by electrical conductors 24 and 25, which are enclosed within a flexible, waterproofed tubing 26 and which extend from the motor 20 rearwardly thereof within the hollow body 6 and outwardly through an opening lined with a compressed grommet 27 of rubber or other suitable material to afford a liquid seal around the covering 26 and around the opening of the body 6 through which said grommet 27 extends.

Figure 4:
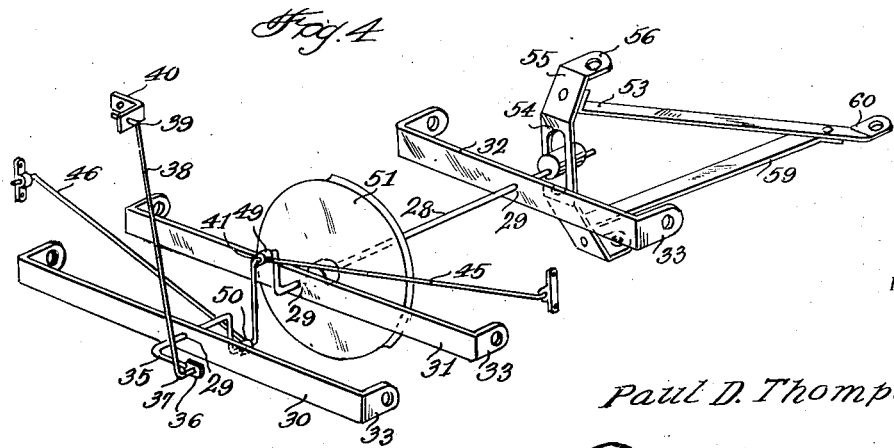
Figure 4 is a perspective view of the actuating mechanism of the decoy.

A drive shaft 28 is disposed longitudinally within the hollow body 6 and is journalled in bearing portions or openings 29 of three elongated bars or brackets 30, 31 and 32, as best seen in Figure 4. The bars or brackets 30, 31 and 32 are provided with rearwardly turned, apertured ends 33 which are secured to the sides of the body 6 by suitable fastenings 34 and for supporting said bearing bars or brackets transversely of the body 6.

The drive shaft 28 is provided with a forward end 35 which is bent at a right angle to the axis of said shaft and which is provided with an enlarged, flat terminal portion 36 which is apertured to form a bearing for an angularly disposed end 37 of a connecting rod 38, which extends upwardly therefrom and which is provided with angularly disposed upper end 39, positioned at a right angle to the end 37 and which is journalled in an opening of one leg of an L-shaped bracket 40. The other leg of the bracket 40 is fastened to the inner side of the rear portion of the head 7 above and adjacent the severance line, and it will be readily apparent that the shaft end 35 forms a crank for accomplishing the rocking movement of the head 7, previously described, when the shaft 28 is revolved.

Between the forward bearing bar 30 and the intermediate bearing bar 31, the shaft 28 is provided with two oppositely disposed cranks 41 and 42. As best seen in Figure 3, the wings 14 and 15 are provided on their inner sides with brackets 43 and 44 which are pivotally connected to the remote ends of a pair connecting rods 45 and 46, respectively. The connecting rods 45 and 46 extend inwardly from the brackets 43 and 44 loosely through openings 47 and 48 in the sides of the body 6 and have bearing portions 49 and 50 respectively, at their inner ends, which are journalled on the cranks 41 and 42, respectively. The bearing portions 49 and 50 preferably include leather bushings, not shown, or other means to eliminate noise.

Rearwardly of and adjacent the intermediate bearing bar 31, the drive shaft 28 is provided with a relatively large pulley 51, which is preferably disposed directly above the pulley 22 and which is connected thereto by an endless belt 52. The grooves of the pulleys 22 and 51 are preferably V-shaped in cross section and the belt 52 is likewise preferably of V-shaped cross section. The pulleys 22 and 51 may be formed of oil treated wood which will not absorb moisture.

The drive shaft 28, adjacent its rear end and rearwardly of the rearmost bearing bar 32, is provided with a relatively elongated eccentric 53 which loosely engages in a longitudinally elongated slot 54 of a bar 55 which is disposed vertically within the rear portion of the body 6 and which is provided with rearwardly turned apertured ends 56 which are pivotally connected to fastenings 57, internally of and at the top and bottom of the body 6. The bar 55 is provided, between the slot 54 and its pivoted end 56 with a pair of rearwardly projecting and rearwardly converging struts 58 and 59 which extend into the tail 11 and which join adjacent their rear ends. One of said struts is provided with an extension 60 which is apertured to pivotally engage a fastening 61 in the tail 11.

Referring to Figure 3, the openings 47 and 48 are preferably sealed by flexible, waterproofed boots 62 which are fastened at their enlarged ends to the outer side of the body 6 and around said openings 47 and 48 and which extend outwardly therefrom and are fastened at their restricted ends to the rods 45 and 46, adjacent the brackets 43 and 44.

The hollow body 6 may be provided with a line attaching eye 63, disposed externally thereof, preferably forwardly of and adjacent the motor compartment 19 and to which one end of a flexible member or line 64 is adapted to be secured. The opposite end of the line or flexible member 64 may be fastened in any suitable manner to a post or other anchoring means driven into a body of water in which the decoy 5 is to be used for tethering the decoy thereto and for permitting the movement of the decoy around said post and within a limited arc.

From the foregoing it will be readily apparent that when the motor 20 is energized to drive its shaft 21, that the shaft 28 will be rotated thereby and at a relatively decreased speed by the connection of the belt 52 to the pulleys 22 and 51 of the shafts 21 and 28, respectively. As the shaft 28 revolves, the head 7, wings 14 and 15 and tail 11 are moved in unison. For example, as the shaft 28 turns from its position of Figure 1, its crank end 35 will move the connecting rod 38 upwardly for rocking the decoy head 7 forwardly and downwardly and back to its position of Figure 1, as the shaft completes one revolution. At the same time, the cranks 41 and 42 will each execute one complete revolution through the initial 180 degrees of which, the wings 14 and 15 will be swung outwardly on their pivots 16 by the outward movement of the connecting rods 45 and 46, and during the last half of which revolution, said wings will be returned to their initial, folded positions of Figure 1. Likewise, during each revolution of the drive shaft 28, the eccentric 53 will execute a complete revolution relatively to the slots 54 for first swinging the bar 55 laterally in one direction from its intermediate position, back to its intermediate position, then laterally in the other direction and back to an intermediate position, so as to cause the tail 11 to likewise swing from an intermediate position laterally in one direction, back to an intermediate position and then laterally in the other direction and finally back to its original, intermediate position. This movement of the head, tail and wings will very realistically simulate the action of a duck swimming on the water, and while feeding, and the decoy will be propelled in the water by this sculling movement of the tail 11, previously described. As previously mentioned, the tethering member 64 will restrict the area in which the decoy 5 may move, for retaining it within easy gun range of hunters located in a blind or other shooting positions, not shown, and wherein the electric source 23, which may constitute a storage battery, can be retained.

In view of the relative size of the pulleys 22 and 51, it will be readily obvious that the motor 20 may be driven at a relatively high speed for readily accomplishing the animated action of the decoy 5, as previously described.

Various modifications and changes are contemplated and may obviously be resorted to, without departing from the spirit or scope of the invention as hereinafter defined by the appended claims.

I claim as my invention:

1. An animated decoy of the character described, comprising a hollow buoyant decoy body having a head and a tail each flexibly connected thereto and externally disposed wings, hingedly connected adjacent their upper edges to the sides of the body, a driven shaft journalled in the body and longitudinally thereof and provided with a plurality of cranks, connecting rods connecting the head and each of the wings to said cranks for causing a bobbing movement of the head and a flapping movement of the wings, when said shaft is revolved, and eccentric means forming a connection between said shaft and the tail for causing a laterally swinging movement of the tail relatively to the body and in unison with the movement of the head and wings.

2. An animated decoy as in claim 1, said eccentric means including a bar pivotally mounted adjacent its upper and lower ends to the top and bottom portions of the decoy body and provided with an elongated, longitudinally disposed opening, a strut member extending rearwardly from said bar and having a rear portion extending into and connected to the tail, and said driven shaft having an eccentrically disposed enlargement for engaging said elongated opening to cause the bar and strut to swing transversely of the decoy body when the shaft is revolved.

3. An animated decoy comprising a hollow buoyant decoy body having a head flexibly connected thereto and externally disposed wings swingably connected adjacent their upper edges to the sides of the decoy body, a driven shaft journaled in the body longitudinally thereof and provided with a plurality of cranks, and connecting rods connecting the head and each of the wings to said cranks for causing a bobbing movement of the head and a flapping movement of the wings when said shaft is revolved.

PAUL D. THOMPSON.

REFERENCES CITED

The following references are of record in the file of this patent:

UNITED STATES PATENTS

| Number | Name | Date |
|---|---|---|
| 443,991 | Ellis | Jan. 6, 1891 |
| 547,553 | Keller | Oct. 8, 1895 |
| 776,905 | Green | Dec. 6, 1904 |
| 901,339 | Grant | Oct. 20, 1908 |
| 1,446,816 | Taylor et al. | Feb. 27, 1923 |
| 1,561,373 | Sweet | Nov. 10, 1925 |
| 2,003,193 | Hirose | May 28, 1935 |
| 2,100,623 | Bates | Nov. 30, 1937 |
| 2,443,040 | Jones | June 8, 1948 |